UNITED STATES PATENT OFFICE.

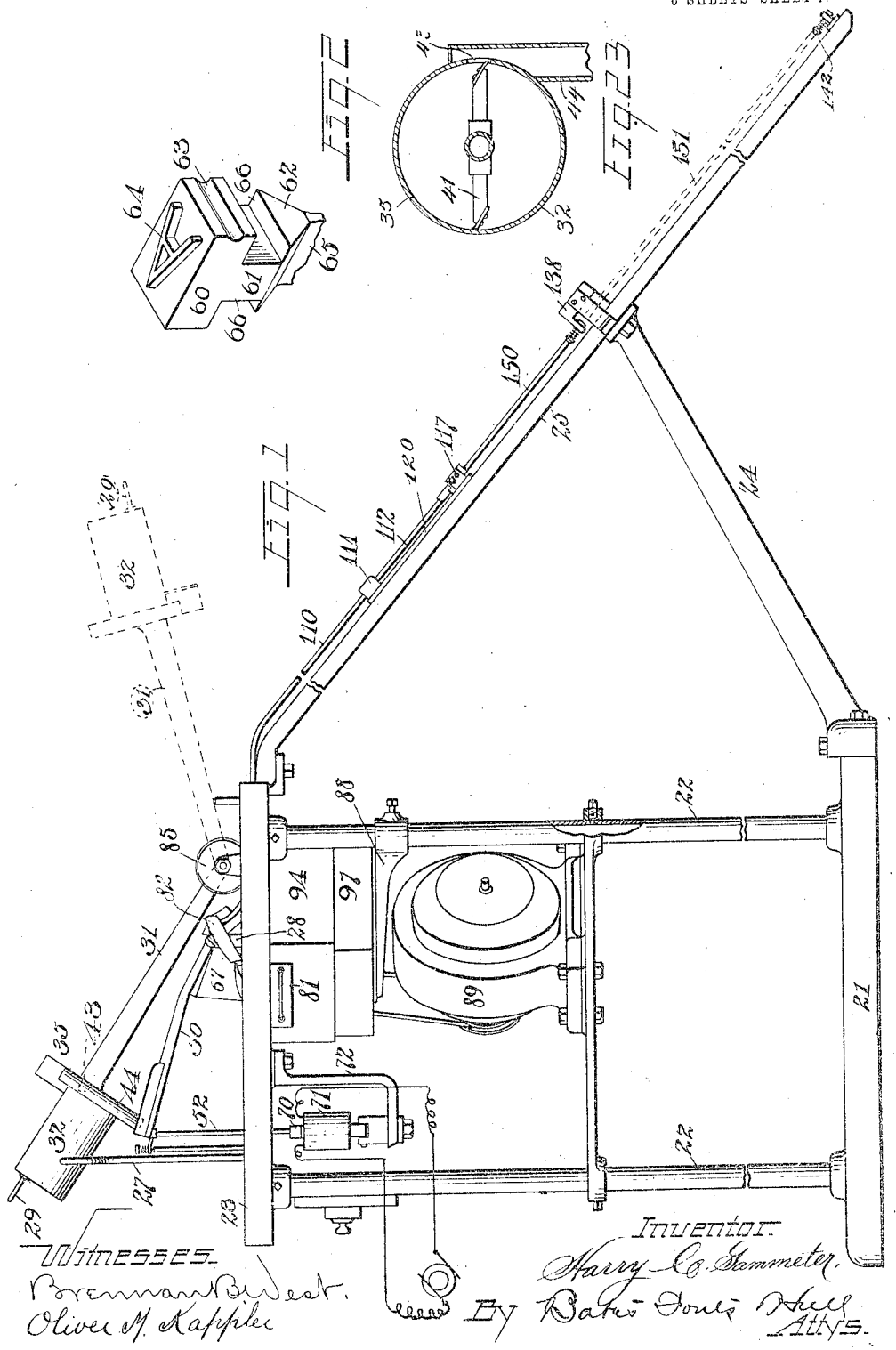

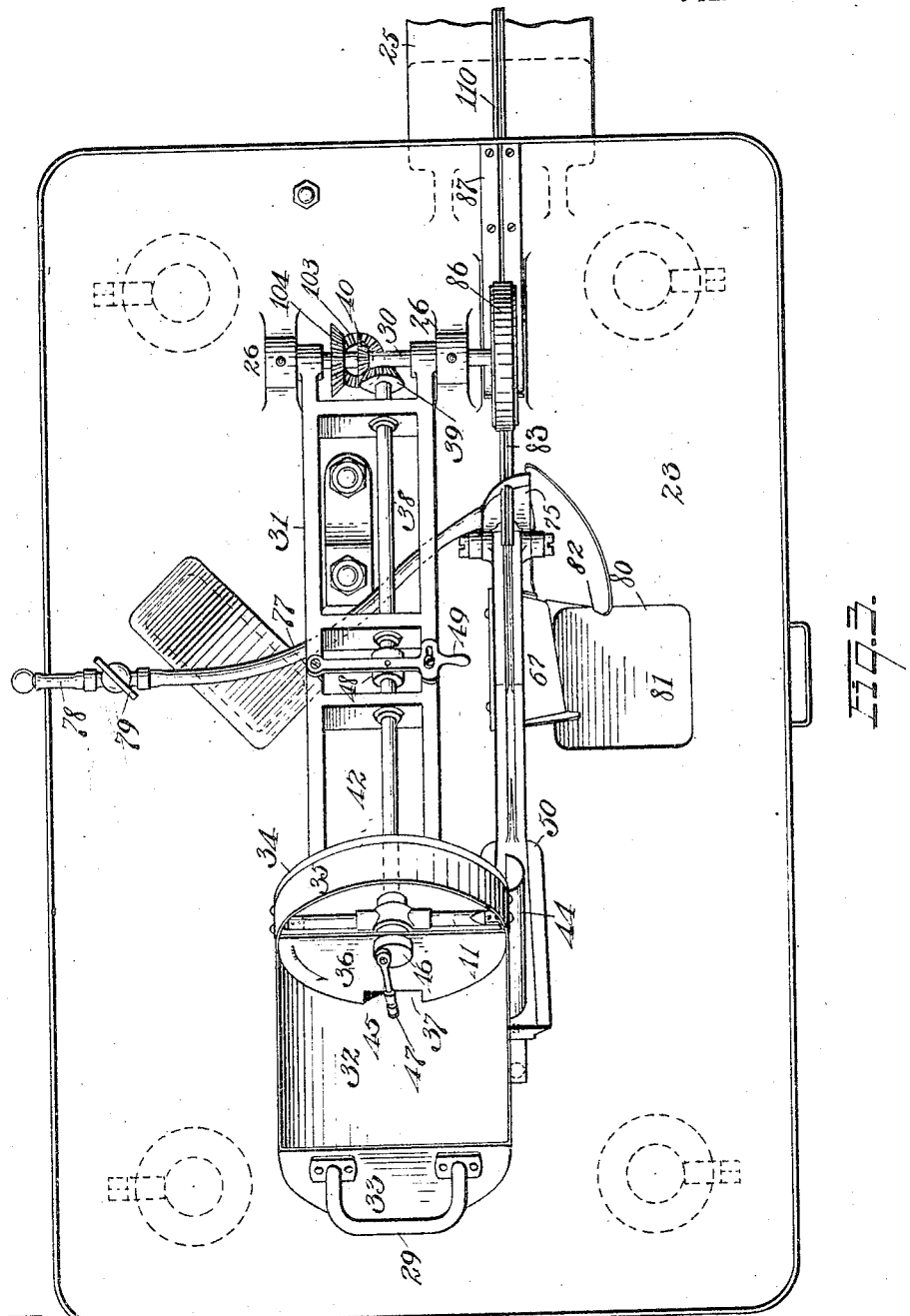

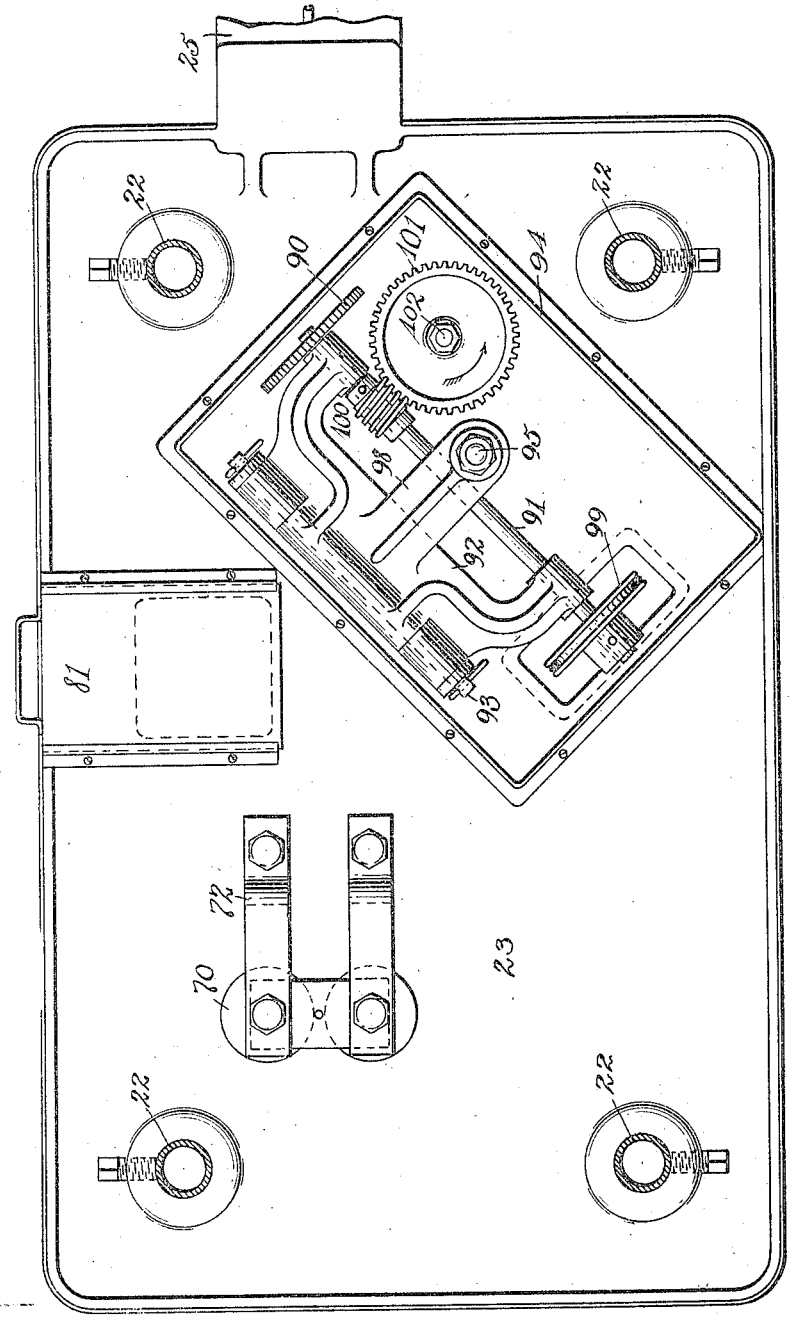

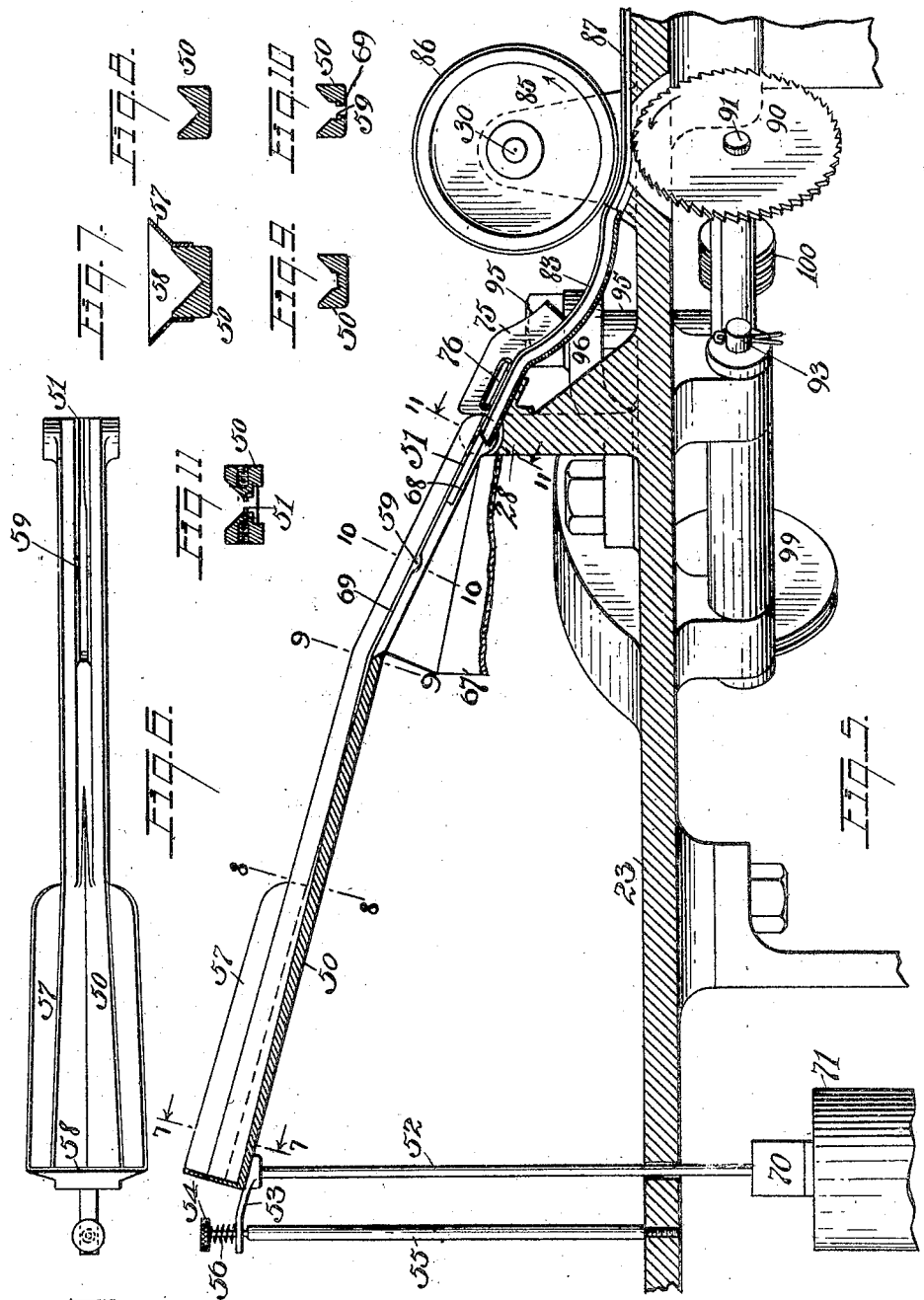

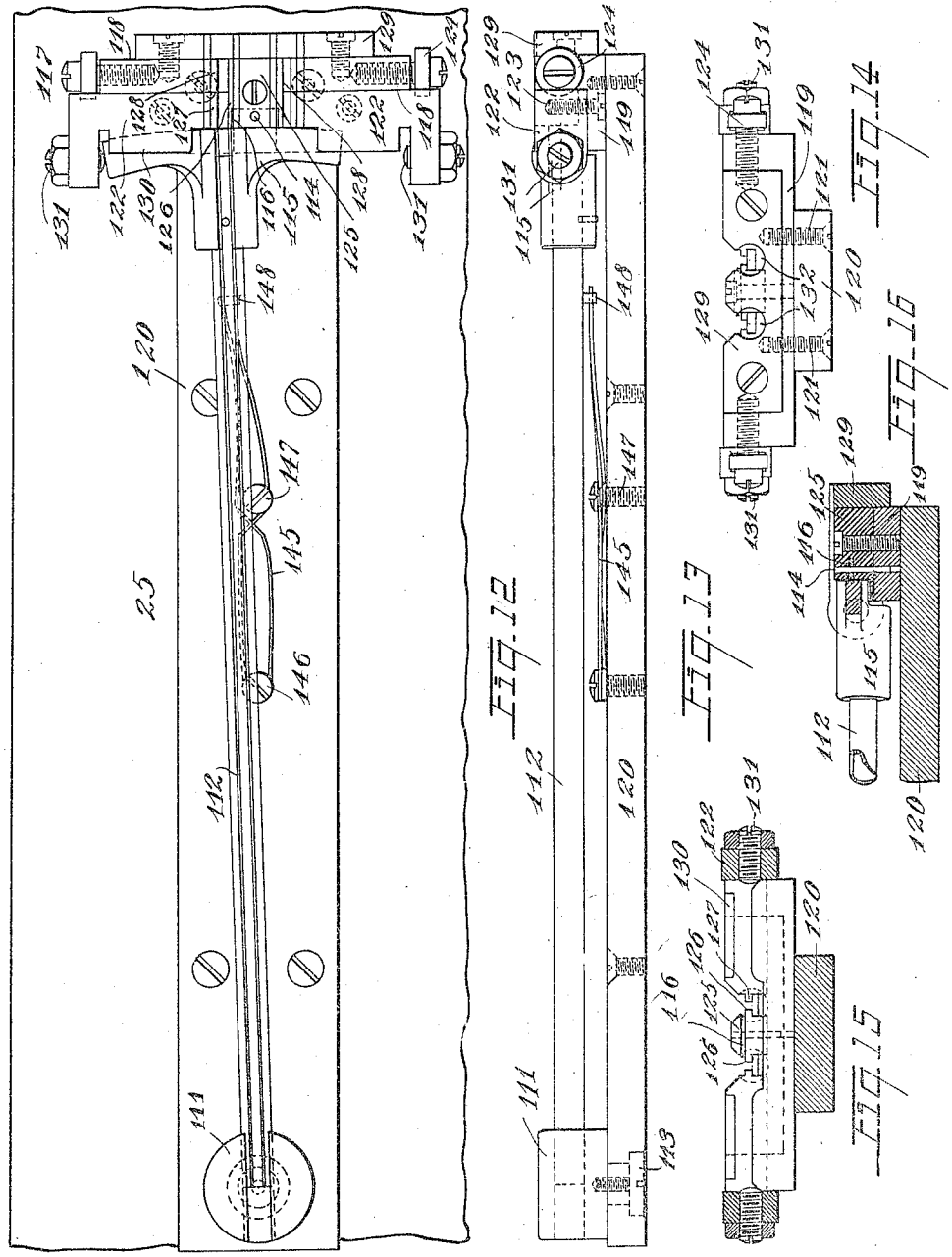

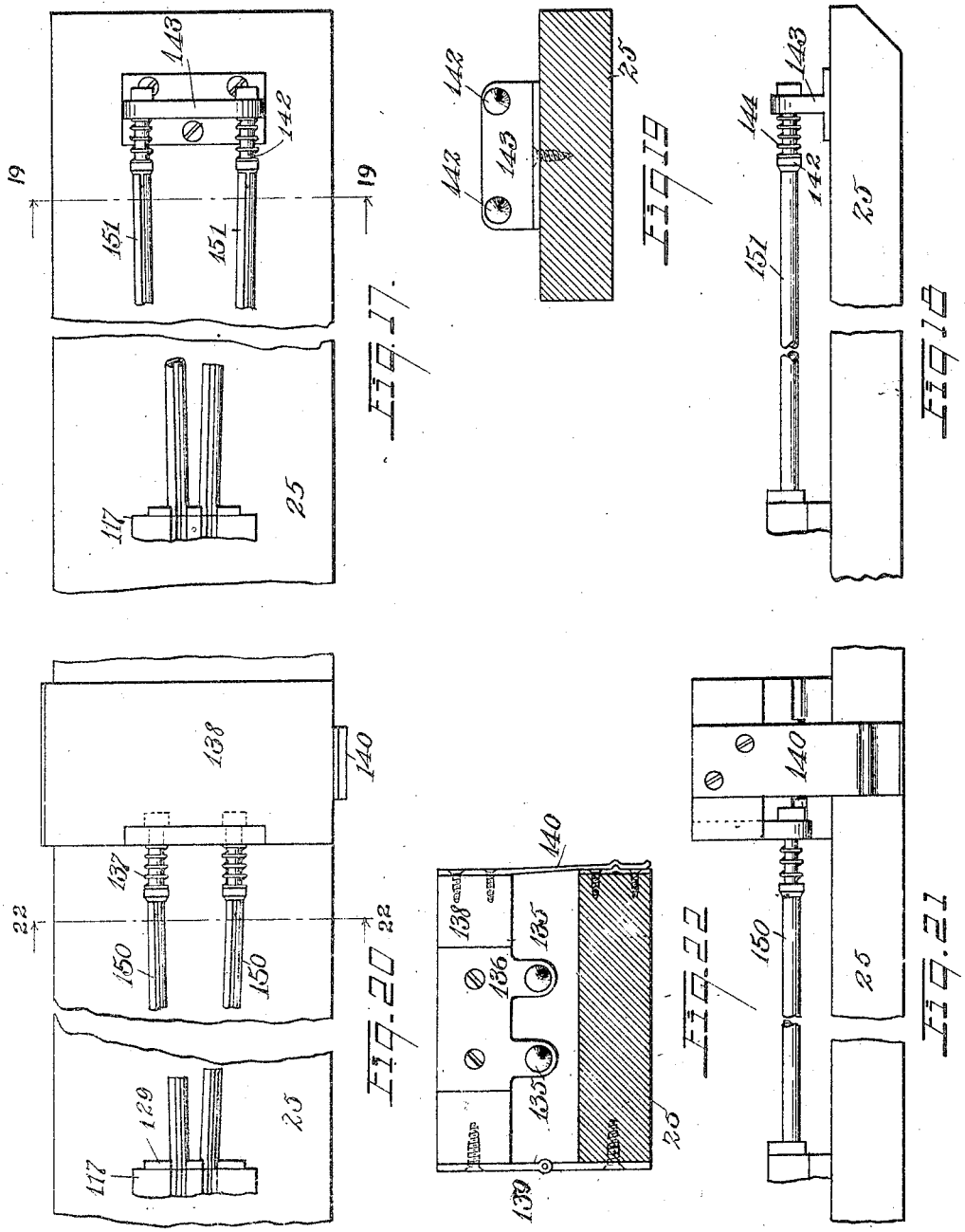

HARRY C. GAMMETER, OF BRATENAHL, OHIO, ASSIGNOR TO THE AMERICAN MULTIGRAPH COMPANY, OF CLEVELAND, OHIO, A CORPORATION OF OHIO.

MACHINE FOR FEEDING TYPE.

1,075,029.  Specification of Letters Patent.  Patented Oct. 7, 1913.

Application filed February 14, 1910. Serial No. 543,680.

*To all whom it may concern:*

Be it known that I, HARRY C. GAMMETER, a citizen of the United States, residing at Bratenahl, in the county of Cuyahoga and State of Ohio, have invented a certain new and useful Improvement in Machines for Feeding Type, of which the following is a full, clear, and exact description, reference being had to the accompanying drawings.

The object of this invention is to provide an effective machine for automatically feeding type from a hopper and assorting them into two channels according to the direction in which the type is facing.

More particularly, my invention, when embodied in a complete machine, in its preferred form, comprises mechanism for receiving in a suitable hopper type grooved on its opposite sides and in automatically feeding such type and holding it and removing any jet, resulting from its casting, and finally distributing the finished product into either of two channels, according to the direction in which the type faces.

The invention comprises mechanism by which I effect the feeding and the treatment desired, as will be hereinafter more fully explained, and as is summarized in the claims.

In the drawings, Figure 1 is a side elevation of my machine; Fig. 2 is a perspective of a type of the character which the machine, in the particular embodiment shown, is adapted to treat; Fig. 3 is a plan of a portion of my machine above the main bed plate; Fig. 4 is a bottom plan or horizontal section below the main bed plate; Fig. 5 is a vertical section through the bed plate and type chute; Fig. 6 is a plan of the type chute; Figs. 7 to 11 inclusive are cross sections of the chute on the correspondingly numbered lines of Fig. 5; Fig. 12 is a plan of the type switch for directing the type into either of the two receiving channels; Fig. 13 is a side elevation of the switch; Fig. 14 is a lower face view of the block or member which holds the upper end of two type receivers and coöperates with the lower end of the switch tube; Fig. 15 is an upper face view, partly sectional, of such block; Fig. 16 is a central cross section of the block, longitudinally of the diagonal bed; Fig. 17 is a plan of the mechanism for holding two comparatively long tubes constituting two type-receiving channels; Fig. 18 is an elevation of such mechanism; Fig. 19 is a cross section on the line 19—19 of Fig. 17; Fig. 20 is a plan of mechanism for holding two comparatively short type-receiving channels; Fig. 21 is a side elevation of the same; Fig. 22 is a cross section on the line 22—22 of Fig. 20; Fig. 23 is a cross section through the hopper.

Referring first to Fig. 1, 21 indicates a suitable subbase from which rise standards 22 carrying at their upper end the main bed plate 23. Extending from the subbase is a suitable strut 24, and carried by this strut and the main bed plate is a diagonal bed 25. Projecting upwardly from the main bed plate 23 are a pair of ears 26 in which is journaled a shaft 30. Loosely mounted on this shaft is a frame 31 carrying at its upper end a hopper trough which is shown as an approximately semi-cylindrical member 32 having a cross plate 33 at its upper end, and, at its lower end, a box-like portion communicating with the main hopper trough by an opening 37 through the partition. This box-like portion is comprised between the parallel walls 34 and 36, the included portion of the member 32 and the semi-cylindrical wall 35. Mounted in the frame 31 above described, is the shaft 38 which is geared at its lower end with the shaft 30 by means of bevel pinions 39 and 40. Near its upper end an extension 42 of this shaft carries a plurality of radial arms 41 which sweep within the box portion at the base of the hopper in the direction of the arrow in Fig. 3 and thus gather up the type passing through the opening 37 and scrape them up the hopper chute to an opening therein, indicated by 43 (Fig. 1), through which they drop and pass by gravity through the tube 44 onto the type chute 50. To assist the passage of the type from the main hopper trough into the receptacle described I provide the agitator bar 45, the upper end of which is mounted on a disk crank 46 on the shaft 38 and the lower end of which passes through an opening in the base of the trough. This bar carries suitable flanges or projections 47 to engage the type and loosen them if they tend to clog.

Fig. 3 shows a clutch 48 connecting the shaft 38 and the extension 42 thereto, this clutch being shown as operated by a suitable lever 49. This construction enables the hopper driving parts to be driven or idle, as desired. Whenever it is desired to empty the hopper of type remaining therein, the whole frame 31 may be swung over into the position indicated by dotted lines in Fig. 1, a suitable handle 29 at the upper end of the hopper being convenient for this purpose. In active position the hopper is supported by the standard 27.

When the type drop from the hopper in a substantially continuous stream, they pass on to the chute 50 referred to. This chute is shown particularly in Figs. 5 to 11 inclusive. It is pivotally mounted near its lower end on a standard 28 rising from the bed plate 23 and is supported near its upper end by a vertical rod 52 which, as hereinafter explained, is given a slight up and down movement to agitate the chute. The chute is guided at its upper end by the arm 53 thereof which surrounds the screw 54, screwing into the upper end of the stationary vertical bar 55. A suitable spring 56 surrounds the shank of the screw.

Before proceeding to the description of the chute construction, it should be noted that the particular embodiment of the machine shown is adapted to operate with type grooved on its opposite sides. This type may be of the particular form shown in Fig. 2, which is covered by my prior Patent #836,026, and comprises a head portion 60, a shank portion 61, and a base portion 62 (providing grooves 66), the base portion being tapered from opposite sides to provide a beveled foot for the type. The foot is shorter (in the direction of the length of the letter) than the head 60 of the type. The head 60 is provided with a groove 63 which bears a definite relation to the character 64 on the type, as, for example, being always at the bottom of such character. When the type is cast there remains on it a projection or jet where the molten metal enters the mold, such jet, in the present case, being illustrated at 65, Fig. 2. It is the object of the particular embodiment shown to receive type of the character just described and remove the jet 65 therefrom and distribute the finished product with the letters all facing in the same direction, such selection being accomplished through the agency of the groove 63. While my machine, in the embodiment shown, operates on type grooved on its opposite sides, such type, even in this embodiment, do not need to have the beveled feet, as the construction shown will operate also with type with flat feet.

Referring now to the chute, which, in the form shown, is designed to operate with grooved type, it will be seen that this chute has, near its upper portion, a V-shaped channel extended by wings 57 provided with an end member 58. Below this, the channel narrows and the wings cease, as shown in Fig. 8. Further down, the channel receives a flat bottom, see Fig. 9. Then it has a steeper inclined portion with an open bottom bounded by side walls 69. At an intermediate point (Figs. 5 and 10) these side walls 69 have the depressions 59 in their upper surfaces, the two depressions being opposite. At the pivotal support of the chute, as indicated by Fig. 11 there is not only an opening through the bottom, but the lower portion of the walls are cut away at 68 to make projecting ribs 51 on opposite sides of the channel.

The result of the peculiarly formed groove in the chute is that the type landing at the head of the chute on top of each other and facing in all directions pass down the chute coming gradually into single file, then, as the chute narrows they assume mostly the desired upright position. The type slide rapidly down the steeper walls 69 but are momentarily retarded by the depressions 59, which gives such type, above the depressions and over the open bottom, as may be turned sidewise an opportunity to drop through the chute. Those which drop through the chute slide down the front side of a plate or trough 67 into an opening 80 in the bed plate. Finally, the type remaining in the chute, to a very large extent, pass on to the ribs 51 with the ribs occupying the grooves 66 between the feet and head of the type.

To cause the type to pass down the inclined chute I have found it very effective to make the chute at such an angle that the type will not normally move from the upper end by gravity alone but will move when gravity is assisted by agitation. This agitation I cause through the bar 52, heretofore mentioned, by connecting the lower end of this bar with a core 70 of a solenoid 71 which receives alternating current. The solenoid is shown as carried by a bracket 72 mounted on the under side of the bed plate. The effect of such alternation is to give the solenoid core very rapid but slight alternate movements. This movement is communicated to the chute, the spring 56 allowing vibration to the latter. In fact, the vibration given to the chute may be more accurately called a tremble, being so slight that it cannot be detected by the eye, though it may by touching the chute with the finger. The effect of the vibration is to cause the type to travel down the chute in a continuous stream.

A comparatively small per cent. of the type will pass down the chute without either dropping through the open bottom or straddling the ribs 51, and such type pass on to a catch receptacle 75 at the lower end of the chute bar. This receptacle is open at its forward side, and at its rear side has a flat elongated nozzle 76 for a hose 77 conveying a blast of air from a suitable pipe 78, a cock 79 in the pipe controlling the blast. This blast of air blows the discarded type forwardly so that they pass down the curved trough 82 into the opening 80 in the bed plate, heretofore referred to.

Beneath the opening 80 in the bed plate is a suitable receptacle, as the drawer 81. When a sufficient number of type have accumulated in this drawer, the drawer is simply removed and the type dumped into the hopper, to be again fed to the chute.

The type which properly arrive at the base of the chute riding on the ribs 51, continue diagonally downwardly in a channel provided by the split tube 83, the grooves of the type riding in the edges of the tube adjacent to the split, so that the type successively come between the metal strips 87 and beneath the wheel 85. This wheel is mounted on the shaft 30 and is continuously revolved in the direction to feed the type. It has a tire 86 soft enough so that the type face will not be injured; for example, this tire may be made of rubber. While the type are being forced along the guides 87 by the wheel 85 the jet is being milled off. The construction of the milling mechanism will now be described.

Referring to Figs. 4 and 5, 90 indicates a milling cutter adapted to act on the jet at the foot of the type when the type is beneath the wheel 85. This milling cutter stands diagonally of the type to obtain a good cut thereon. The cutter is mounted on the end of the shaft 91, which is journaled in a bracket 92 hinged to the bed plate 23 at 93. The presentation of the cutter to the type is adjusted by the bolt 95 screwing through the ear 96 on the bed plate into an arm 98 of the bracket 92. The shaft 91 may be rotated by the belt pulley 99 suitably driven, as, for example, by the motor 89, Fig. 1.

The chips resulting from the milling operation may conveniently be caught in a box 97 which telescopes with a rectangular frame 94 on the underside of the bed plate. This box is removably held by the arm 88 slidably mounted on one of the standards 22, which enables the convenient removal of the collected chips whenever desired.

I find it convenient to drive the shaft 30, which operates the wheel 85 and the hopper arms, from the shaft 91 which drives the milling cutter. This I accomplish by mounting a worm 100 on the shaft 91 which meshes with the worm wheel 101 on the lower end of the vertical shaft 102. On the upper end of this shaft 102 is a bevel gear 103 which meshes with the bevel gear 104 on the shaft 30.

The mechanism above described results in the type being fed successively along the guides 87 in coöperation with the milling cutter and having the jet 65 milled off of the foot of the type. The type is now ready for distribution into its holders. It is to be understood that the type placed in the hopper at any time are preferably all of the same letter or character so that the distribution or assortment following the milling operation consists of assembling the finished type into two channels, according to which way the characters thereon face. This operation will now be described.

Mounted on the diagonal bed 25 is a single-row type channel 110 which leads from the channel defined by the guides downward to a swiveled block 111. In this block is mounted the upper end of a split tube 112 which, from its function, I term the switch tube. The swiveling of the block 111 may be accomplished by a screw 113 in the plate 120 mounted on the diagonal bed 25.

The lower end of the switch tube 112 stands in a notch in the upper diagonal face of the stationary block or member 117 and is movable therein. This member is composed of a number of normally stationary parts, arranged to give the necessary adjustments, as shown in Figs. 12 to 16. One of these parts consists of a cross plate 119 secured to the longitudinal strip 120 by screws 121. This plate 119 is recessed on its upper face leaving a pair of upwardly projecting integral portions or blocks 118. Resting on the plate 119, alongside of the projections 118, are the two blocks 122. These blocks are held by screws 123, which occupy enlarged openings in the plate 119, and are adjustable in and out (so that they may be accurately positioned according to the type with which they coöperate) by means of screws 124, screwing into the blocks 118, and having flanges on their heads occupying recesses in the blocks 122 respectively.

In the recess between the separated portions 118, and between the blocks 122, is a block 125 which carries ribs 126 on its opposite sides. Standing opposite these ribs are ribs 127 and 128 on the blocks 122 and 118 respectively. Secured to the lower side of the member 119 is a plate 129 which is formed with a pair of partly cylindrical recesses 132 adapted to receive two discharge tubes, hereinafter referred to. Mounted in the block 125 is a strip 116 projecting in opposite directions from the block a short distance into the type channels above the ribs 126. The edges of this strip constitute wards which are on the left hand side of one groove, and the right hand side of the other. Now, this ward 116 is adapted to aline with the groove 63 in the edge of the head of the type. Accordingly, type presented to either channel, if the groove 63 alines with the corresponding ward, will pass into that channel; while, if the groove 63 does not aline with the ward the type will not so pass, but will pass into the other channel when the switch tube is presented thereto. It is therefore only necessary to shift the switch tube back and forth to present it to one channel and then the other to cause the type to pass into the two grooves facing in the selected direction— all the type of one groove facing one way and all the type of the other groove facing the other way.

The lower end of the switch tube 112 is provided with a T-shaped head 115, which forms a reinforce for the lower end of the tube and a handle by which it may be operated and lies over the forward portion of the plate 119 and beneath flanges 130 on the forward edge of the blocks 122. This head, accordingly, has a defined guideway in which it may travel. Its movement is adjustably limited in either direction by the set screws 131 mounted in ears on the blocks 122.

The switching operation referred to is very conveniently effected by hand, the operator manually taking hold of the head 115 and swinging the tube back and forth to the limits provided by the set screws 131. The switch tube is normally centered by a double-armed leaf spring 145 which is secured to the bed plate at 146 and crosses itself behind a pin 147 of the bed plate, the two arms projecting on opposite sides of this pin and standing on opposite sides of a lug 148, projecting downwardly from the switch tube. This construction normally centers the tube and allows it to be conveniently swung by hand in either direction. The operator swings the tube and watches the flow of the type and the instant the flow stops, swings the tube to the other channel, the result being that one or more type pass first into the one groove and then into the other, and so on continuously. I have found that, by the operation described, the type may be distributed very rapidly to the two channels.

The head 115 acts as a weight tending to prevent jerking in the swing of the pendulum-like switch tube. The exact amount of swing may be regulated to a nicety by the set screws 131, while the screws 124 enable accurate adjustment of the blocks 122. The ribs 128 (which have a fixed position) stand as far from the ribs 126 as it will ever be desired to have the ribs 127, so that in the adjustment of the latter ribs no shoulder is presented in a direction to retard the type.

To receive the type passing from the two grooves in the block 117 I provide holders in the form of split tubes, and I find it convenient to provide the machine with mechanism for carrying both long and short holders. The short holders are indicated at 150 in Fig. 1 and the long holders occupy the same space, and, in addition, the space indicated by the broken lines 151 in Fig. 1. The short split tube holders 150 and their supporting mechanism are shown in detail in Figs. 20, 21 and 22. From these figures it will be seen that the split tube holders 150 stand with their upper ends in the recesses 132 and with their edges alining with the ribs 126 and 128. At their lower ends the holders are supported by conical pointed pins 135 which are mounted in a plate 136 and are pressed toward the block 117 by springs 137. Accordingly, the holders may be put in place by putting their lower ends about the points 135 and then pressing such points diagonally downwardly until the upper ends of the holders may be inserted in the grooves 132. The plate 136 is carried by a block 138, which is shown as hinged at 139 to the diagonal bed plate 25, the block being latched on the other side to the bed plate by the latch 140.

When the short tubular holders 150 are used for receiving the type, the block 138 is stationary and, in the position shown in Figs. 1, 20, 21 and 22. When, however, it is desired to use the long holders, the latch 140 is drawn outwardly sufficiently to release the block and the block is swung over onto the far side of the bed plate so as to be out of the way. Then, the long tubular holders 151 are placed on the spring-pressed pins 142 carried by a bracket 143 at the lower end of the bed plate 25. These pins are loose in the bracket and pressed by springs 144 similar to the pins already described, and the tubes are put in place in the same manner as already described.

It will be seen from the above description that my machine is simple in construction and operates automatically to cause the feeding and finishing of the type, and that the subsequent distribution into the two channels, while not strictly automatic, may be effected with great rapidity and without requiring skill on the part of the operator or close attention to a flow of the type. In fact, the shifting of the switch tube soon becomes, to the operator, as automatic as any manual operation can. The type coming from the foundry in packages of the same letter are simply dumped into the hopper, and, in the end, are stored in finished form and facing the proper direction in the receiving tubes. The short tubes may be very conveniently used where it is desired to ship the type in the tubes, while the long tubes may conveniently be transferred to a suitable type storage and assemblage machine, if desired.

Having now described my invention, what I claim is:—

1. In a machine of the character described, the combination of a hopper, a chute for receiving the discharge thereof and having an upwardly opening trough which is substantially V-shaped with a closed bottom at its upper portion and presents a pair of separated ribs with an opening between them near its lower portion, said separated ribs being at a steeper inclination than the closed bottom.

2. In a machine of the character described, the combination of a chute, means for discharging type onto the same, said chute having near its bottom a pair of separated ribs and having a retarder to allow the type body to swing downwardly between the ribs.

3. In a machine of the character described, the combination of a hopper and a chute for receiving the hopper discharge and provided with a progressively narrowing trough adapted to centralize the type and bring them into proper alinement, and a retarder at the narrow portion of the trough.

4. In a machine of the character described, the combination of a hopper, an upwardly opening inclined chute adapted to receive the hopper discharge and formed with a progressively narrowing trough, and separated ribs in its narrow portion, there being a pair of depressions in the upper surface of the ribs.

5. In a machine of the character described, the combination of a chute adapted to convey type by gravity, a channel for receiving and confining type properly conveyed in the chute, means for receiving type improperly conveyed, and an air blast arranged to act transversely of the chute on such improperly conveyed type, and remove them without disturbing the properly conveyed type.

6. In a machine of the character specified, the combination of an inclined chute down which type grooved on its opposite sides may travel by gravity, a rib near the lower portion of such chute substantially alining therewith and adapted to be embraced by a groove in the type, a channel for receiving type from the rib, and a receptacle for receiving type whose groove does not straddle the rib.

7. In a machine of the character specified, the combination of an inclined chute down which type grooved on its opposite sides may travel, a rib near the lower portion of such chute adapted to enter a groove in the type, a channel for receiving type from the rib, a receptacle for receiving type whose groove does not straddle the rib, and an air blast acting transversely of the normal travel of the type to remove type from said receptacle.

8. In a machine of the character specified, the combination of a chute down which type grooved on its opposite sides may travel, a rib near the lower portion of such chute adapted to enter a groove in the type, and means for receiving discarded type from points both in front of the rib and above it.

9. In a machine of the character described, the combination, with a channel adapted to hold unselected type, of two receiving channels coöperating therewith, there being provision for relative movement between the first-mentioned channel and the receiving channels, so that either receiving channel may register with the channel first mentioned, and selecting wards at the entrances to the receiving channels, said wards facing oppositely in the two channels, whereby one receiving channel will take the type facing in one direction and the other channel type facing in the opposite direction.

10. The combination of a distributing channel, a pair of receiving channels, means whereby the same distributing channel may coöperate with either receiving channel, and wards carried at the entrance to the receiving channels and located oppositely in the two channels so that one ward may coöperate with type facing in one direction and the other with type facing in the other direction.

11. The combination of a distributing channel, means for pivotally mounting the same near one end, means for guiding the other end thereof and limiting its movement, whereby it may be oscillated, a pair of receiving channels side by side, either of which is adapted to register with the distributing channel, and wards positioned diametrically oppositely in the respective receiving channels.

12. In a machine of the character described, the combination of a distributing channel mounted in an inclined position, means for pivotally mounting the same adjacent to its upper end, means for guiding the lower end, two receiving channels side by side adjacent to the lower end of the distributing channel and either of which may register therewith, and wards placed at the entrance to the respective receiving channels and located in the right hand portion of one and the left hand portion of the other.

13. In a machine of the character specified, the combination of a distributing channel adapted to slidably confine type grooved on its opposite sides, two receiving channels adapted to slidably confine such type, said receiving channels being placed in position whereby either may register with the distributing channel, there being provision for relative movement between the distributing channel and receiving channels respectively, and wards at the entrances to the receiving channels positioned to engage a notch in the edge of the head of the type when held in the distributing channel at its exit end, said two wards facing in opposite directions, whereby one coacts with type facing one way and the other with similar type facing in the opposite way.

14. In a machine of the character specified, the combination of a plurality of type channels formed to receive and confine grooved type, a switching channel adapted to coöperate with either of the channels mentioned, and selecting wards differently placed at the entrance to the two first mentioned channels.

15. In a machine of the character specified, the combination of a switching channel, two receiving channels formed with ribs to engage grooved type, and wards different in the two channels to engage a defining groove in the type and determine which way it is facing.

16. In a machine of the character specified, the combination of a switching channel adapted to confine type grooved on its opposite sides and having a head with a defining groove in its edge, and a number having two receiving channels side by side and provided with ribs to enter the ordinary grooves of the type and provided further with differently placed wards to enter the defining groove of the type.

17. In a machine of the character specified, a channel, an inclined bed down which such channel leads, a switching channel pivotally mounting on said bed, a plurality of receiving channels coöperating with the discharge end of the switching channel, and selecting wards at the mouth of the receiving channels.

18. In a machine of the character specified, the combination of a movable switching channel, a coöperating member having a plurality of channels with ribs, and means for adjusting the position of said ribs.

19. In a machine of the character specified, the combination of a block having two inwardly facing separated portions carrying ribs and an intermediate block having two outwardly facing ribs, and a movable switch member to coöperate therewith.

20. In a machine of the character specified, the combination of a pair of stationary blocks carrying inwardly facing ribs, a pair of blocks adjustably mounted on the blocks first mentioned and carrying also inwardly facing ribs adapted to substantially register with the ribs first mentioned, a block intermediate of the blocks first mentioned carrying ribs on its opposite sides and suitable type channels coöperating with the channels defined by the ribs.

21. In a machine of the character specified, the combination of a pair of blocks having inwardly facing ribs, a pair of adjacent relatively movable blocks having also inwardly facing ribs, adjusting screws carried by one of the pair of blocks engaging the other pair, and means for holding the type coöperating with the ribs.

22. In a machine of the character specified, the combination of a bed plate, a member mounted thereon and having a pair of upwardly extending separated blocks, a plate secured to said member and having two recesses for type holders, two blocks mounted on said member, adjusting screws carried by said member and engaging the blocks last mentioned, substantially alining ribs carried by the member and blocks last mentioned, and an intermediate block mounted on the member and having ribs on its opposite sides adapted to stand opposite the ribs first mentioned.

23. In a machine of the character specified, the combination of a type channel, a spring-pressed tail piece, and a removable type receiver adapted to be mounted on the tail piece and engage the channel.

24. In a machine of the character specified, the combination of a block having a type channel, a second block, a spring-pressed tail piece carried thereby, and a tubular type holder adapted to center on the tail piece and have its upper end engage a recess in the block first mentioned.

25. In a machine of the character specified, the combination of a block having a channel, two tail pieces for the lower end of a type holder, the upper end of which coöperates with said block, and means for swinging the upper tail piece to idle position to allow a holder to be employed from the block to the lower tail piece.

26. In a machine of the character specified, the combination of a support, a type channel therein, a removable type holder adapted to coöperate with the type channel, and means for holding the lower end of the removable type holder, said means being mounted on a hinge on said support.

27. In a machine of the character specified, the combination of an inclined bed, a block hinged thereto, a support for a type holder carried by said block, another support for the type holder carried by the bed below the block, and means carried by the bed above both supports for holding the upper end of such type holder.

In testimony whereof, I hereunto affix my signature in the presence of two witnesses.

HARRY C. GAMMETER.

Witnesses:
 ALBERT H. BATES,
 BRENNAN B. WEST.